(12) United States Patent
Abbing

(10) Patent No.: US 10,995,869 B2
(45) Date of Patent: May 4, 2021

(54) FLUID STOP VALVE UNIT

(71) Applicant: 3EFLOW AB, Luleå (SE)

(72) Inventor: Erik Abbing, Luleå (SE)

(73) Assignee: 3EFLOW AB, Lulea (SE)

( * ) Notice: Subject to any disclaimer, the term of this patent is extended or adjusted under 35 U.S.C. 154(b) by 0 days.

(21) Appl. No.: 16/798,882

(22) Filed: Feb. 24, 2020

(65) Prior Publication Data
US 2020/0191289 A1 Jun. 18, 2020

Related U.S. Application Data

(63) Continuation of application No. 15/738,313, filed as application No. PCT/EP2016/064307 on Jun. 21, 2016, now Pat. No. 10,612,679.

(30) Foreign Application Priority Data

Jul. 2, 2015 (SE) .................................. 1550943-3

(51) Int. Cl.
*F16K 17/04* (2006.01)
*F16K 15/06* (2006.01)
*F16K 15/14* (2006.01)

(52) U.S. Cl.
CPC ............ *F16K 17/044* (2013.01); *F16K 15/06* (2013.01); *F16K 15/147* (2013.01); *F16K 17/0493* (2013.01); *Y10T 137/7932* (2015.04)

(58) Field of Classification Search
CPC ...... F16K 15/06; F16K 15/147; F16K 15/044; F16K 15/0493; F16K 47/00; Y10T 137/7929–7939; E03B 1/04; E03B 7/07; F16L 55/052; F24D 17/0031; F24D 19/1051

USPC ............................................ 137/540–543.23
See application file for complete search history.

(56) References Cited

U.S. PATENT DOCUMENTS

| 1,334,507 A | 3/1920 | Shartle |
| 1,833,841 A | 11/1931 | Leinert |
| 2,162,719 A | 6/1939 | Hay |
| 2,173,930 A | 9/1939 | Brandt |
| 2,632,621 A | 3/1953 | Gamble |
| 2,875,776 A ‡ | 3/1959 | Skipwith, Jr. |

(Continued)

FOREIGN PATENT DOCUMENTS

| DE | 3400716 A1 ‡ | 7/1985 |
| DE | 3400716 A1 | 7/1985 |

(Continued)

OTHER PUBLICATIONS

International Preliminary Report on Patentability from corresponding International Application No. PCT/EP2016/064307, dated Oct. 11, 2017.‡

(Continued)

*Primary Examiner* — William M McCalister
(74) *Attorney, Agent, or Firm* — Tucker Ellis LLP

(57) ABSTRACT

The present invention concerns a fluid stop valve unit comprising at least one fluid stop valve and a pressure responsive part, integrated or separate, arranged so that the at least one fluid stop valve is kept in a closed state. The pressure responsive part, integrated or separate, has an opening characteristic going from the closed state to an open state with a decrease of pressure after a threshold pressure has been reached.

20 Claims, 8 Drawing Sheets

(56) References Cited

U.S. PATENT DOCUMENTS

| | | | |
|---|---|---|---|
| 2,897,835 A ‡ | 8/1959 | Philippe |
| 3,036,592 A | 5/1962 | Lips |
| 3,179,122 A | 4/1965 | Wasdell |
| 3,194,262 A | 7/1965 | Hamilton et al. |
| 3,302,662 A | 2/1967 | Webb |
| 3,565,108 A | 2/1971 | Johnson |
| 3,768,509 A | 10/1973 | Goda |
| 3,807,440 A ‡ | 4/1974 | Tibbals, Jr. |
| 4,310,140 A ‡ | 1/1982 | Boomer et al. |
| 4,708,168 A | 11/1987 | Peruzzi |
| 4,821,954 A | 4/1989 | Bowder |
| 4,944,487 A ‡ | 7/1990 | Holtermann |
| 4,964,423 A | 10/1990 | Gausman et al. |
| 6,039,072 A | 3/2000 | Hellhole et al. |
| 6,401,749 B1 | 6/2002 | Tai et al. |
| 6,443,183 B1 | 9/2002 | Roorda |
| 8,096,319 B2 | 1/2012 | Beck |
| 2013/0209298 A1‡ | 8/2013 | Gaertner et al. |
| 2014/0202543 A1‡ | 7/2014 | Abbing |
| 2018/0180190 A1 | 6/2018 | Abbing |

FOREIGN PATENT DOCUMENTS

| | | | |
|---|---|---|---|
| EP | 1350896 A2 ‡ | 10/2003 |
| EP | 1350896 A2 | 10/2003 |
| GB | 1032596 A ‡ | 6/1966 |
| GB | 1032596 A | 6/1966 |
| GB | 2351546 A ‡ | 1/2001 |
| GB | 2351546 A | 1/2001 |
| WO | 2008113135 A1 | 9/2008 |
| WO | WO-2008113135 A1 ‡ | 9/2008 |
| WO | 2014072979 A1 | 5/2014 |
| WO | WO-2014072979 A1 ‡ | 5/2014 |

OTHER PUBLICATIONS

Swedish Office Action from Swedish Application No. 1550943-3 dated Mar. 21, 2016.‡
International Search Report and Written Opinion from corresponding International Application No. PCT/EP2016/064307, dated Sep. 20, 2016.‡
International Search Report and Written Opinion from corresponding International Application No. PCT/EP2016/064307, dated Sep. 20, 2016, 10 pages.
International Preliminary Report on Patentability from corresponding International Application No. PCT/EP2016/064307, dated Oct. 11, 2017, 13 pages.
Swedish Office Action from Swedish Application No. 1550943-3 dated Mar. 21, 2016, 9 pages.

‡ imported from a related application

FLUID STOP VALVE UNIT

CROSS-REFERENCED APPLICATIONS

This application is a continuation of U.S. patent application Ser. No. 15/738,313, filed Dec. 20, 2017, which claims the benefit of European PCT Application No. PCT/EP2016/064307, filed Jun. 21, 2016, which claims priority to Swedish Patent Application No. SE1550943-3, filed Jul. 2, 2015, the disclosures of which are incorporated herein by reference in their entireties.

FIELD OF TECHNOLOGY

The present invention concerns a fluid stop valve unit, which is kept in a closed state by default and having an inventive opening characteristic.

BACKGROUND ART

There are a lot of previously known fluid stop valves, for example WO 2008/113135 A1, which shows a valve opening at a threshold pressure.

SUMMARY OF THE INVENTION

A problem with known valves are that they require an increased force in order to further open from a threshold opening force.

The aim of the present invention is to overcome this problem and provide a fluid stop valve unit having an opening characteristic going from the closed state to an open state with a decrease of pressure after a threshold pressure has been reached.

According to an aspect of the present invention a fluid stop valve is provided, which comprises at least one fluid stop valve and a pressure responsive part, integrated or separate, arranged so that the at least one fluid stop valve is kept in a closed state, the pressure responsive part, integrated or separate, having an opening characteristic going from the closed state to an open state with a decrease of pressure after a threshold pressure has been reached.

According to one embodiment the at least one fluid stop valve is a non-return valve.

According to different embodiments the pressure responsive part comprises a part made of rubber or elastomer; or is a separate spring.

According to one embodiment the spring is made of metal. According to a further embodiment the spring comprises at least one diaphragm spring. According to another embodiment the spring has two stabilized, resting positions. This could be the natural resting positions of the spring or made by having stop or stops mounted to provide resting positions. According to one embodiment the diaphragm spring is made of metal and has a number of spring fingers. Preferably, the spring fingers are arranged along a rim of the spring and the fingers pointing with their free ends towards a centre. According to a further embodiment the separate spring comprises two diaphragm springs, which may be arranged in the fluid stop valve unit in a mirrored way or stacked. It is also possible to have more than two diaphragm springs.

According to one embodiment of the invention the fluid stop valve is a liquid stop valve, for use in a liquid distribution system having at least one feeding conduit and at least one tap unit, the fluid stop valve unit has an inlet end which is arranged to be connected to a liquid feeding conduit in use and an outlet end arranged to be connected to a tap unit in use. For example, the threshold pressure could be 25-50% but also up to 90% of the system pressure. The threshold pressure could as an example be 1-2 bars over pressure above atmospheric pressure. The closing pressure could be as low as 0.1 bar. Due to this characteristic of the fluid stop valve the risk of hammering in the conduits will be minimized. Additionally, it will also minimize the risk of closing the fluid stop valve if a sudden pressure drop in the system would occur. The required threshold pressure across the valve to open it, is several times higher than the required pressure across the valve to hold it in an open position. Therefore, with a given system pressure available, the critical flow rate will be significantly higher due to low pressure drop across the valve compared with a common valve with a linear opening/closing characteristic.

According to a further embodiment the at least one small orifice liquid conduit/opening is provided at the inlet end of the liquid stop valve unit, which is open at its first end towards the feeding conduit in use and to the at least one liquid stop valve at its second end, the at least one small orifice liquid conduit or opening being capable of keeping liquid inside it even when the feeding conduit is evacuated of liquid in use.

According to another embodiment the separate spring is forceable against its biasing direction so that the at least one liquid stop valve opens when liquid and the threshold pressure reaches the first end of the small orifice liquid conduit.

According to one embodiment two non-return valves are arranged in series in the fluid stop valve unit. According to another embodiment the at least one non-return valve comprises a valve body, which is spring loaded by a coil spring towards its valve seat.

According to one embodiment of the present invention the fluid stop valve is a gas stop valve, for use in a liquid distribution system having at least one feeding conduit and at least one tap unit, the gas stop valve unit has an inlet end which is arranged to be connected to a gas chamber in use and an outlet end arranged to be connected to the liquid feeding conduit in use.

According to one embodiment the gas stop valve is a non-return valve and opens when the pressure difference is at least 2 bar, preferably at least 3 bar.

According to one embodiment the fluid stop valve is for a liquid distribution system having a centrally located liquid source connected via at least one separate feeding conduit to at least one liquid tap unit, wherein each feeding conduit is evacuated of liquid when an associated tap unit is closed and refilled with liquid after the tap unit is opened or about to be opened.

BRIEF DESCRIPTION OF DRAWINGS

The present invention will now be described in more detail under referral to appended drawings, in which.

DETAILED DESCRIPTION OF EMBODIMENTS OF THE INVENTION

Figure 1:
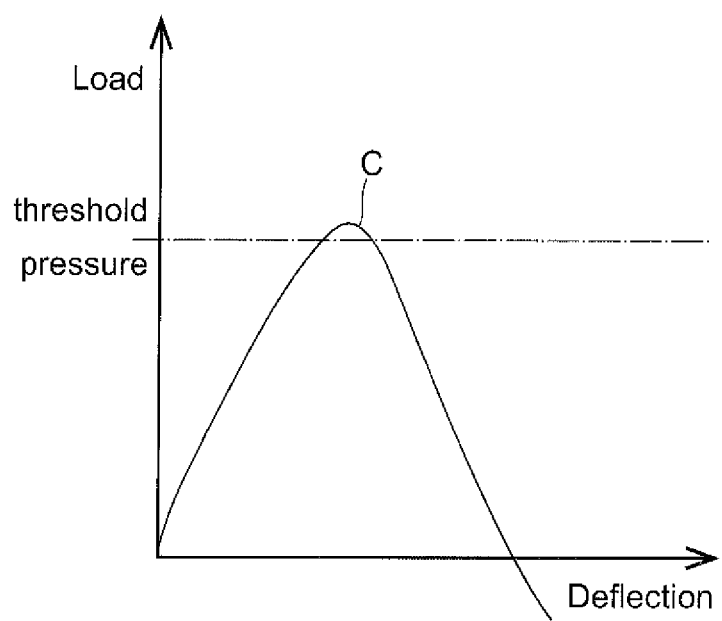
FIG. 1 shows a graph of load deflection characteristics for a fluid stop valve according to the invention.

In FIG. 1 a graph is shown explaining the opening characteristics of an inventive fluid stop valve unit 1 comprising at least one fluid stop valve 2 and a pressure responsive part 3. The pressure responsive part 3 may be separately arranged in the fluid stop valve 2 or integrated. It is desirable that an opening of the fluid stop valve 2 opens as much as possible as soon as a threshold pressure is reached. This can be accomplished if the load deflection characteristics curve is in accordance with the suggested curve in the graph such that the deflection is quickly increased, even up to fully open valve, without any increase or incremental increase of load or even a decrease of load after the threshold load has been reached. Curve C shows a characteristic with a decreasing load and despite this having a long deflection. Thus the fluid stop valve 2 will have a significantly higher flow rate at the same pressure drop or differential pressure across the valve, which will result in a higher flow rate than what would be possible with a common valve with the same required pressure to open.

The pressure responsive part 3 is arranged so that the at least one fluid stop valve 2 is kept in a closed state, by default, for example by being biased towards a closed state or by inherent forces kept closed, until a threshold pressure has been reached. According to a preferred embodiment the pressure responsive part is having a characteristics according to FIG. 1.

Figure 2:
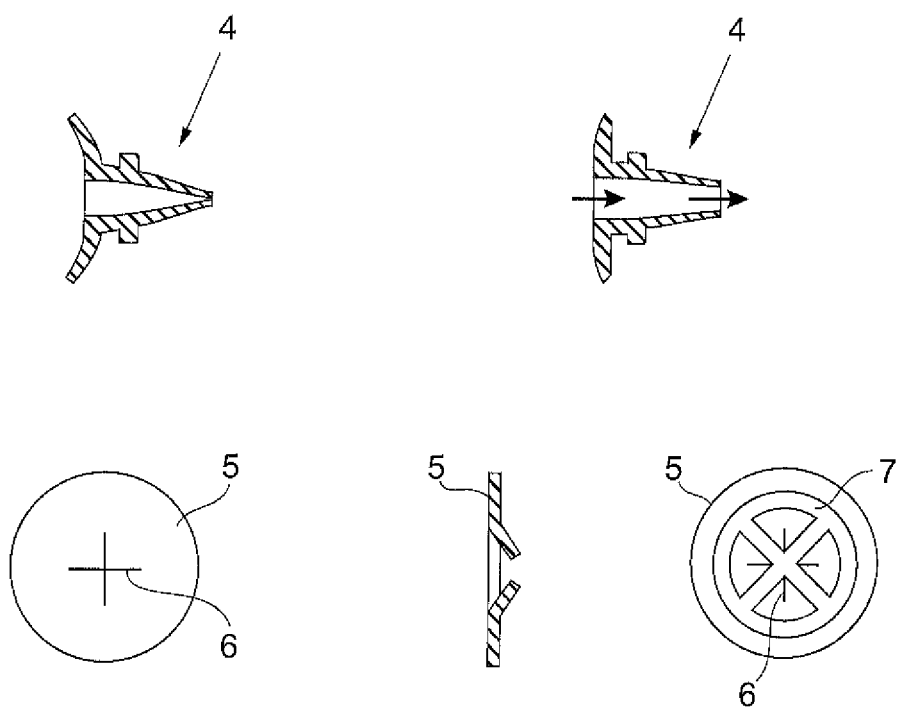
FIG. 2 shows a number of embodiments of a fluid stop valve unit wherein the pressure responsive part is a made of rubber or elastomer.

In FIG. 2 conceivable embodiments of a pressure responsive part 3 are shown made of rubber or elastomer. For example it could be a duck bill valve 4, where the pressure responsive part 3 is integrated as an inherent characteristic of the material, or a membrane 5 having at least one slit 6. If the membrane 5 valve is supported 7 on one side the membrane 5 it will only let fluid through in one direction.

Figure 3A:
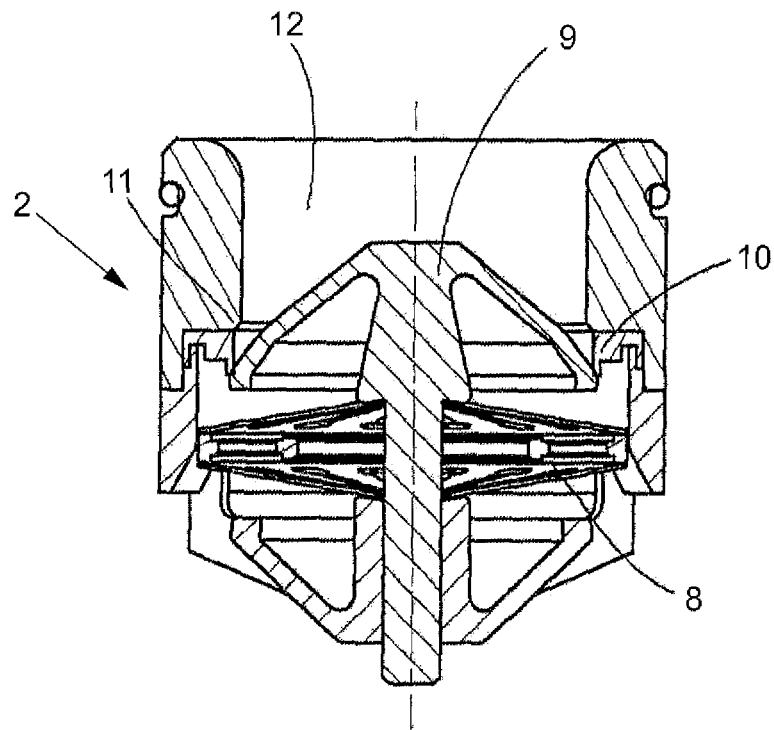
FIGS. 3a and b shows an embodiment where the pressure responsive part is an integrated spring.
Figure 3B:
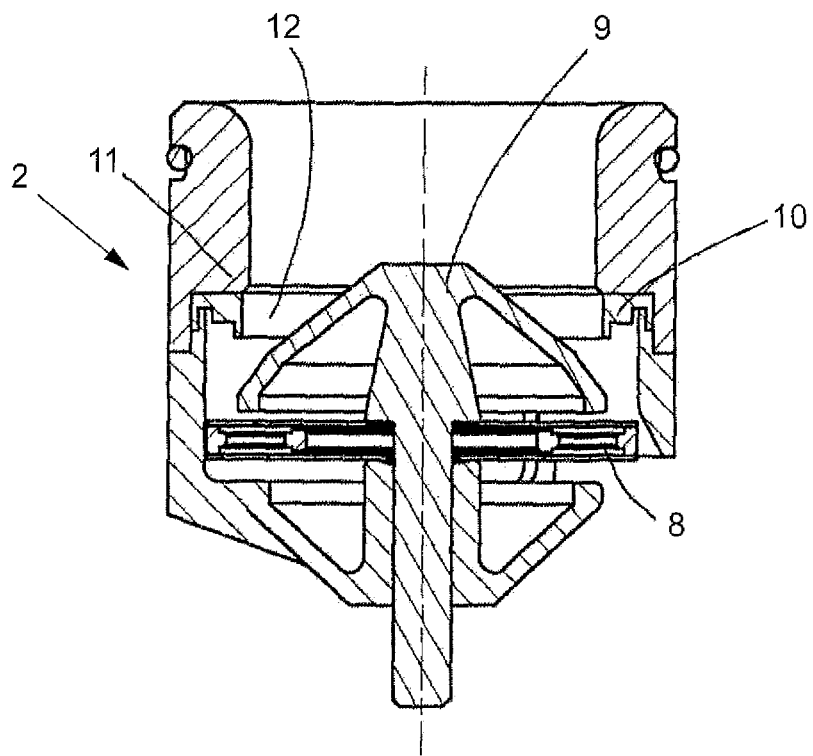

In FIG. 3 an embodiment of the fluid stop valve 2 is shown where the pressure responsive part 3 is a spring 8, which is integrated in the valve 2. The fluid stop valve 2 is shown in two states, a closed state FIG. 3a and an open state FIG. 3b. In FIG. 3a a valve body 9 is in sealing contact with a seal 10 arranged in a valve seat 11 so that no fluid may flow through a fluid channel 12. A spring 8 bias the valve body 9 towards the seal 10 so that the valve is kept in a closed state until a pressure reaches a threshold level, i.e. over winning the biasing spring force and thus compress the spring 8, whereby the valve body 9 deflects towards an open state, as shown in FIG. 3b. In the shown embodiment two diaphragm springs of metal, arranged in a mirrored way, are used although it is possible to use only one spring or an elastomer type of spring, for example, as long as it has a characteristic curve according to FIG. 1.

Figure 4:
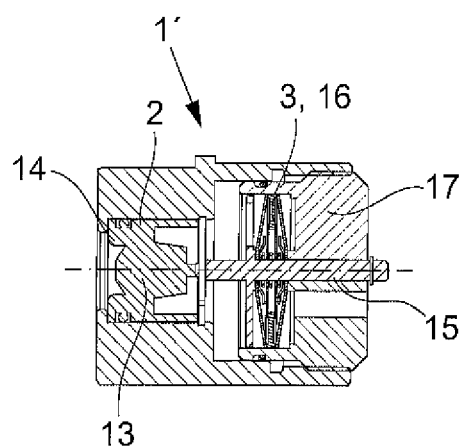
FIG. 4 shows an embodiment where the pressure responsive part is a separate spring.

In FIG. 4 an embodiment of a fluid stop valve 1 is shown having a separate pressure responsive part 3, in this case a separate spring 16. For example, this could be an elastomeric membrane spring or a metal diaphragm spring. Preferably the spring is of metal and has spring fingers, see FIG. 7. A fluid stop valve 2 is arranged in series with the spring 16. For example the fluid stop valve 2 may be a non-return valve having an internal coil spring (not shown) with a constant spring characteristic and a valve body 13 biased by this coil spring towards a valve seat 14.

Figure 8:
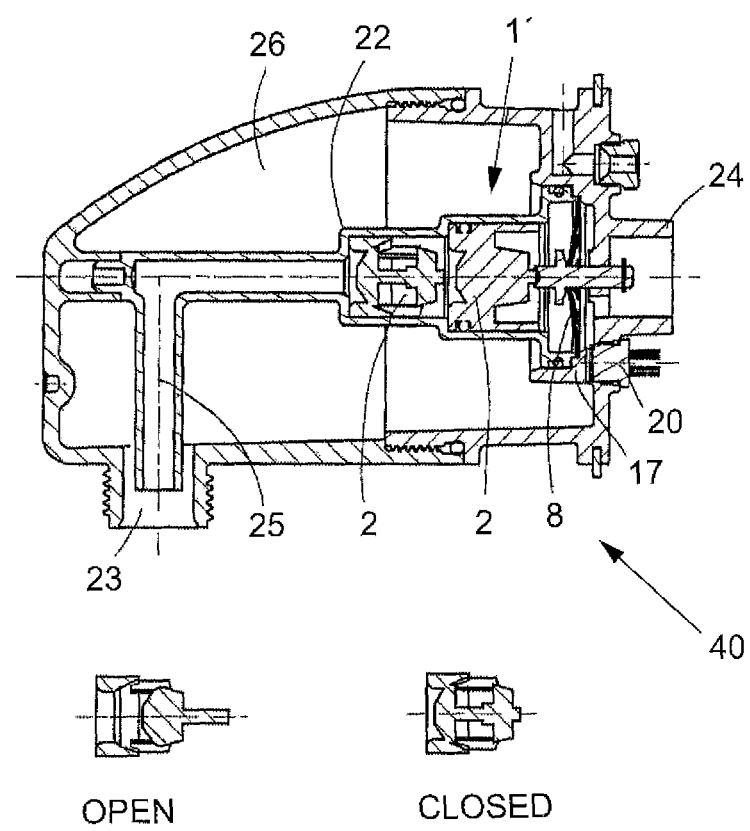
FIG. 8 shows a detailed view of a fluid stop valve in open and closed state, respectively.

In FIG. 8 one of two fluid stop valves 2 is shown in detail in both an open and closed state. A central axle 15 is arranged from the valve body 13 in the flow direction of the fluid in the open state. At the axle 15 the spring 8 is fixedly attached and resting in a housing 17. The spring 16 has a characteristic according to FIG. 1. When a threshold pressure is reached the non-return valve 2 opens and the spring 16 will be compressed with a long deflection opening up the fluid stop valve unit 1, letting fluid flow through the fluid stop valve unit 1.

Figure 5:
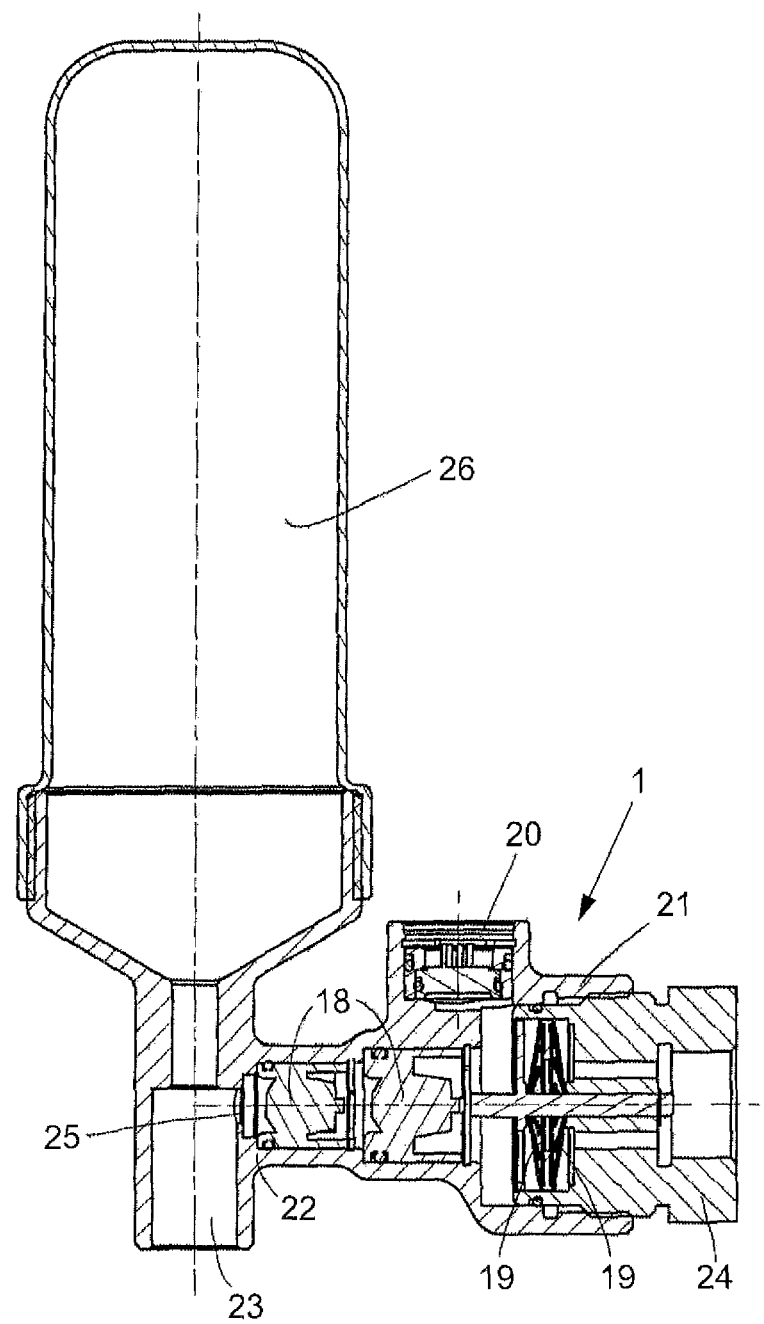
FIG. 5 shows an embodiment of a liquid stop valve unit.

In FIG. 5 a fluid stop valve unit 1 is shown for use in a liquid distribution system having at least one feeding conduit and at least one tap unit (not shown). This unit 1 is a liquid stop valve unit 1' comprises two liquid stop valves 18, preferably non-return valves, arranged in series with also a separate pressure responsive part 3, in the shown case two mirrored diaphragm springs 19. The design is similar to the embodiment of FIG. 4. An inlet side 22 of the liquid stop valve unit 1 is connected to a conduit, preferably via a passage 23, in use. An outlet end 24 is connected to the tap unit, in use. A pressure sensor 20 is provided in a housing 21 for sensing the pressure downstream the valves 18 in the flow direction towards the tap unit. Preferably, the liquid stop valve unit 1' is for a liquid distribution system having a centrally located liquid source connected via at least one separate feeding conduit to at least one liquid tap unit, wherein each feeding conduit is evacuated of liquid when an associated tap unit is closed and refilled with liquid when the tap unit is opened.

At least one small orifice liquid conduit/opening 25 is provided at the inlet end 22 of the liquid stop valve unit 1', which is open at its first end towards the feeding conduit or passage 23 in use and to the at least one liquid stop valve 1' at its second end. The at least one small orifice liquid conduit or opening 25 is capable of keeping liquid inside it even when the feeding conduit or passage 23 is evacuated of liquid in use. This could be accomplished by means of capillary forces, for example. When liquid is reaching the at least one small orifice/opening 25 and the pressure of the liquid has reached a threshold level the at least one liquid stop valve 18 will open and due to the separate spring 19 the opening characteristics will be as shown in FIG. 1. A dampening chamber 26 is present, too, in accordance with a separate patent application of the same applicant.

Figure 6:
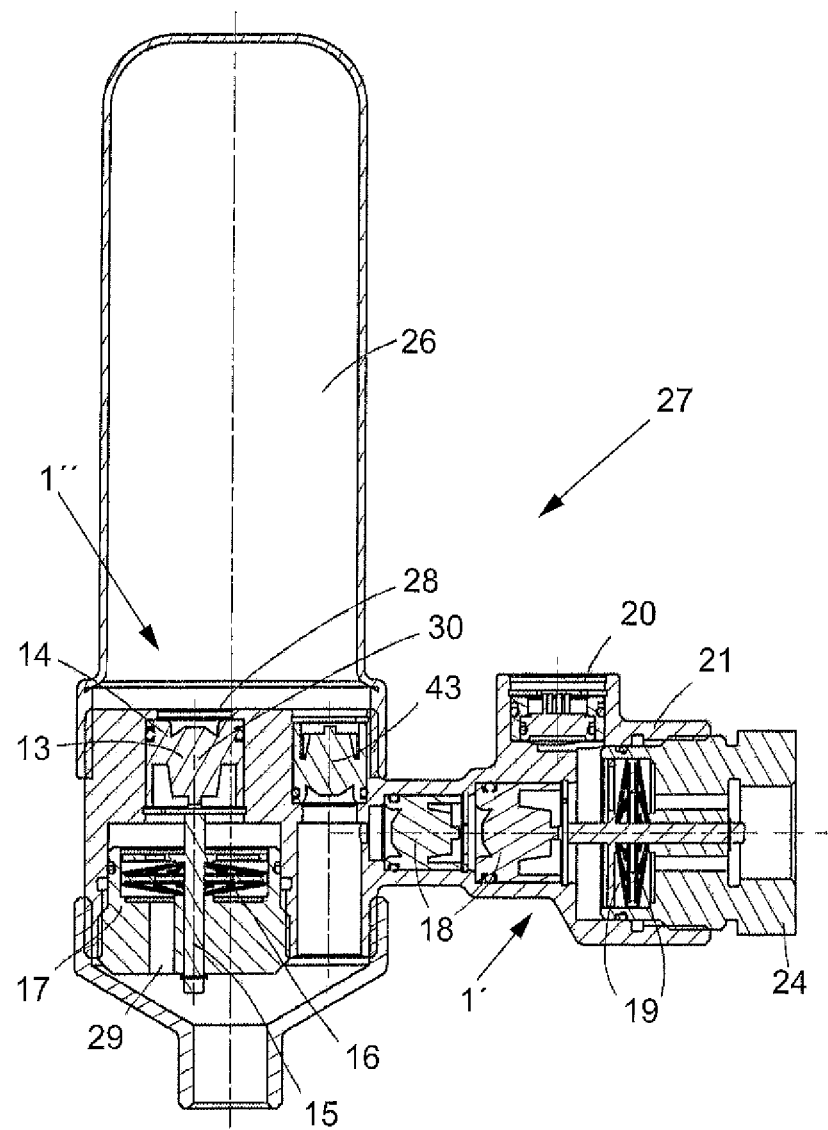
FIG. 6 shows an embodiment with both a liquid stop valve unit and a gas stop valve unit.

In FIG. 6 two fluid stop valves 1', 1" are arranged in a dampening valve unit 27. One unit 1' is a liquid stop valve unit similar to the embodiment of FIG. 5. The other unit 1" is a gas stop valve 1", for use in a liquid distribution system having at least one feeding conduit and at least one tap unit (not shown). The gas stop valve unit 1" has an inlet end 28 which is arranged to be connected to a gas chamber 26 in use and an outlet end 29 arranged to be connected to the liquid feeding conduit in use. The gas stop valve unit 1" shown has a separate pressure responsive part 3, in this case a separate spring 16. For example, this could be an elastomeric membrane spring or a metal diaphragm spring. Preferably the spring is of metal and has spring fingers, see FIG. 7. A gas stop valve 30 is arranged in series with the spring 16. For example the gas stop valve 30 may be a non-return valve having an internal coil spring (not shown) with a constant spring characteristic and a valve body 13 biased by this coil spring towards a valve seat 14. A central axle 15 is arranged from the valve body 13 in the flow direction of the fluid in the open state. At the axle 15 the spring 16 is fixedly attached and resting in a housing 17. The spring 16 has a characteristic according to FIG. 1. When a threshold pressure is reached the non-return valve 30 opens and the spring 16 will be compressed with a long deflection opening up the gas stop valve unit 1", letting gas flow through the gas stop valve unit 1". The gas stop valve unit 1" may for example open when a pressure difference between the inlet end 28 and the outlet end 29 is more than 2 bar, preferably more than 3 bar.

Figure 7:
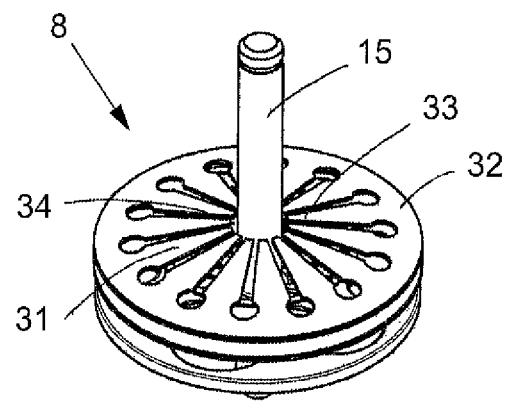
FIG. 7 shows an embodiment of a diaphragm spring having spring fingers.
Figure 7:
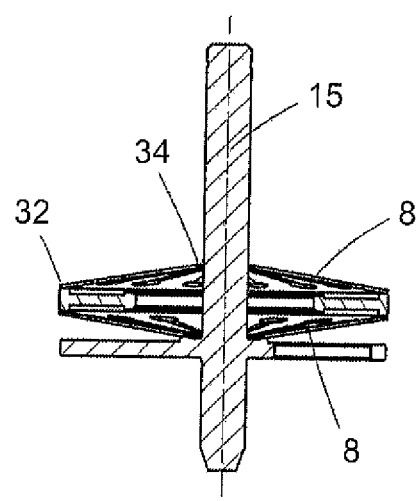

In FIG. 7 two springs 8 are shown, both in a perspective view and a cross sectional view, having a diaphragm design with spring fingers 31 arranged along a rim 32 of the spring 8 and the fingers 31 pointing with their free ends 33 towards a centre 34. The two springs 8 are provided in a mirrored way and arranged at an axle 15. In the shown state the springs 8 are unloaded. This spring 8 may have one or two resting states and a characteristic as shown in the graph of FIG. 1.

In FIG. 8 the liquid stop valve unit 1' is arranged within a dampening chamber 26 providing a compact dampening valve unit 40. Here the small orifice conduit 25 is much longer than previously shown, where it has been more of an opening. When liquid is reaching the passage 23 and the inlet of the small orifice conduit the liquid stop valve 1' will open and let the liquid flow towards and out of the tap unit 42. The gas, such as air, being pushed in front of the liquid during refilling of the feeding conduit 41, will be locked and compressed inside the dampening chamber 26. One of the two fluid stop valves 2 is shown in detail in both an open and closed state.

The invention claimed is:

1. A fluid stop valve unit comprising:
   at least one fluid stop valve that is a non-return valve having a first valve body end facing a valve seat and a second valve body end facing in an opposite direction than the first valve body end; and
   a pressure responsive part, integrated or separate, arranged so that the at least one fluid stop valve is biased in a closed state, wherein the pressure responsive part is a spring comprising at least one diaphragm spring that biases the at least one fluid stop valve in the closed state and that is compressible when a pressure acting on the first valve body end of the at least one fluid stop valve reaches a threshold pressure that is 1-2 bar higher than an ambient atmospheric pressure to move the first valve body end of the at least one fluid stop valve in a flow direction to an open state,
   wherein the pressure responsive part, integrated or separate, has an opening characteristic allowing the at least one fluid stop valve to remain in the open state, after the pressure has reached the threshold pressure, when the pressure decreases below the threshold pressure and is greater than or equal to 0.1 bar, to allow flow in the flow direction past the first valve body end toward the second valve body end.

2. A fluid stop valve unit according to claim 1, wherein the threshold pressure is reached when at least 25% of a system pressure is reached.

3. A fluid stop valve unit according to claim 1, wherein the threshold pressure across the valve to move the valve to the open state is several more than two times greater than a pressure across the valve to hold the valve in the open state.

4. A fluid stop valve unit comprising:
   at least one fluid stop valve that is a non-return valve having a first valve body end facing a valve seat and a second valve body end facing in an opposite direction than the first valve body end; and
   a pressure responsive part, integrated or separate, arranged so that the at least one fluid stop valve is biased in a closed state, wherein the pressure responsive part is a spring comprising at least one diaphragm spring that biases the at least one fluid stop valve in the closed state and that is compressible when a pressure acting on the first valve body end of the at least one fluid stop valve reaches a threshold pressure to move the first valve body end of the at least one fluid stop valve in a flow direction to an open state,
   wherein the pressure responsive part, integrated or separate, has an opening characteristic allowing the at least one fluid stop valve to remain in the open state, after the pressure has reached the threshold pressure, when the pressure decreases below the threshold pressure, to allow flow in the flow direction past the first valve body end toward the second valve body end, and
   wherein the threshold pressure is reached when a pressure differential between the inlet end and an outlet end of the fluid stop valve is more than two bar, and wherein a closing pressure of the fluid stop valve unit is 0.1 bar.

5. The fluid stop valve unit according to claim 1, wherein said diaphragm spring is made of rubber or elastomer.

6. The fluid stop valve unit according to claim 1, wherein said diaphragm spring is made of metal.

7. The fluid stop valve unit according to claim 6, wherein the diaphragm spring has a number of spring fingers.

8. The fluid stop valve unit according to claim 7, wherein the spring fingers are arranged along a rim of the diaphragm spring and the fingers pointing with their free ends towards a centre.

9. The fluid stop valve unit according to claim 1, in the form of a liquid stop valve unit, wherein at least one small orifice liquid conduit/opening is provided at an inlet end thereof, the at least one small orifice liquid conduit/opening being open at its first end towards a feeding conduit in use and being capable of keeping liquid inside it even when said feeding conduit is evacuated of liquid in use.

10. The fluid stop valve unit according to claim 9, wherein said diaphragm spring is forceable against its biasing direction so that the at least one liquid stop valve opens when liquid and the threshold pressure reaches the first end of the small orifice liquid conduit.

11. A fluid stop valve unit, the fluid stop valve unit comprising at least one fluid stop valve and a pressure responsive part, integrated or separate, arranged so that the at least one fluid stop valve is kept in a closed state, the pressure responsive part, integrated or separate, having an opening characteristic going from the closed state to an open state with a decrease of pressure to a level greater than or equal to 0.1 bar after a threshold pressure that is 1-2 bar higher than an ambient atmospheric pressure has been reached or passed, wherein the at least one fluid stop valve is a non-return valve, said pressure responsive part comprising at least one diaphragm spring, which is deformable between two stabilized, first and second resting positions, said first resting position constituting said closed state of the fluid stop valve, and said second resting position constituting said open state of the fluid stop valve and providing a maximum fluid flow therethrough, there being a position of said diaphragm spring, from/between said first and second resting positions, in which the fluid pressure needed is decreasing from the threshold or maximum pressure causing the fluid stop valve to open when the pressure is increasing up to said threshold pressure, wherein said at least one diaphragm spring is configured to exert a decreasing but still biasing force, when being deformed further from said intermediate position to said second resting position, at which it is still biased towards a closed state.

12. A fluid stop valve unit according to claim 11, wherein the threshold pressure is reached when at least 25% of a system pressure is reached.

13. A fluid stop valve unit according to claim 11, wherein the threshold pressure across the valve to move the valve to the open state is several more than two times greater than a pressure across the valve to hold the valve in the open state.

14. The fluid stop valve unit according to claim 11, wherein the threshold pressure is reached when a pressure differential between the inlet end and an outlet end of the fluid stop valve is more than two bar, and wherein a closing pressure of the fluid stop valve unit is 0.1 bar.

15. The fluid stop valve unit according to claim 11, wherein said diaphragm spring is made of rubber or elastomer.

16. The fluid stop valve unit according to claim 11, wherein said diaphragm spring is made of metal.

17. The fluid stop valve unit according to claim 16, wherein the diaphragm spring has a number of spring fingers.

18. The fluid stop valve unit according to claim 17, wherein the spring fingers are arranged along a rim of the diaphragm spring and the fingers pointing with their free ends towards a centre.

19. The fluid stop valve unit according to claim 11, in the form of a liquid stop valve unit, wherein at least one small orifice liquid conduit/opening is provided at an inlet end thereof, the at least one small orifice liquid conduit/opening being open at its first end towards a feeding conduit in use and being capable of keeping liquid inside it even when said feeding conduit is evacuated of liquid in use.

20. The fluid stop valve unit according to claim 19, wherein said diaphragm spring is forceable against its biasing direction so that the at least one liquid stop valve opens when liquid and the threshold pressure reaches the first end of the small orifice liquid conduit.

* * * * *